March 26, 1929.　　　G. INNES　　　1,707,199
SHOCK SWEEP
Filed Dec. 11, 1926　　　5 Sheets-Sheet 1

March 26, 1929.  G. INNES  1,707,199
SHOCK SWEEP
Filed Dec. 11, 1926  5 Sheets-Sheet 2

March 26, 1929.  G. INNES  1,707,199
SHOCK SWEEP
Filed Dec. 11, 1926   5 Sheets-Sheet 3

INVENTOR
George Innes
BY
Evans & McCoy
Attorneys

March 26, 1929.  G. INNES  1,707,199
SHOCK SWEEP
Filed Dec. 11, 1926    5 Sheets-Sheet 5

Patented Mar. 26, 1929.

1,707,199

UNITED STATES PATENT OFFICE.

GEORGE INNES, OF DAVENPORT, IOWA, ASSIGNOR TO INNES SHOCKER COMPANY, OF DAVENPORT, IOWA, A CORPORATION OF IOWA.

SHOCK SWEEP.

Application filed December 11, 1926. Serial No. 154,105.

This invention relates to agricultural implements and more particularly to a machine for loading shocks of grain or the like from the field and transporting them.

An object of this invention is to provide such a shock sweep, for gathering grain which has been cut and bound as by a harvesting reaper and binder and formed into shocks, either by hand or machine.

A further object of this invention is to provide such a machine having means for readily loading the shocks thereon and closure means for retaining the bundles on the sweep when fully loaded, together with means for raising the load clear of the ground so that it may be readily transported over the field to the threshing machine.

Another object of the invention is to so construct the sweep that the shocks may be loaded therein, transported to any desired place, and positively unloaded without requiring the operator to manually handle the bundles of grain or to leave the driving seat.

A further object of the invention is to provide a sweep on which the shocks may be loaded relatively easily substantially bodily as they exist in the field, that is, in the upright position, whereby any loose grain or broken bundles existing in the shock are bodily carried to the threshing machine or other desired place.

These and other objects will be apparent from the following description and annexed drawings, in which.

The machine consists of a cradle-like body structure 1 having side members 2 connected at the rear by a pair of crossbeams 3 and 4 to which are secured a series of teeth or tines 5. Coextensive with the side members 2 are supplementary side members $2^a$ connected with the side members 2 by suitable reinforcing means $2^b$. Secured to the forward ends of the side members 2 and the supplementary side members $2^a$ are pairs of spaced uprights 6 and 7, which support a suitably reinforced, transversely extending beam 8. Thus the spaced uprights 6 and 7 form convenient columns between which the forward weight supporting wheels 9 for the structure are journaled.

The upright members 6 are provided with suitable journaled sockets 10 to which is pivoted the gate structure 11 extending transversely of the cradle and designed to close the forward end of the same when the cradle is fully loaded. The transversely extending bridge beam 8 is of sufficient height above the teeth of the cradle to permit the passage thereunder of the standing shocks of grain being loaded.

The gate structure 11 comprises horizontally extending members 12, 13 suitably reinforced and the member 13 carries a series of stirrups 14, one for each tooth 5, as will be more fully hereinafter described.

Extending rearwardly from the cradle 1 is the longitudinal member 15 on which is supported the transverse member 16 which carries the driver's seat 17 and seat beam 18. The transverse member 16 also carries the operating levers 19 and 20, which are more fully described hereinafter, and said beam 16 is supported by a pair of caster wheels 21. The member 16 is spaced rearwardly of the cradle a sufficient distance so that horses may be located between the beam and the rear of the cradle. It is preferred to use a pair of horses on each side of the machine, and two trees (not shown) may be readily secured to the beam 16 adjacent its end.

At the sides of the cradle and secured to the members 3 and 4 and extending rearwardly therefrom are the arms 22 to which are secured the caster wheels 23.

Mounted on the cross member 4 are rods 25 carrying swivelly mounted pulleys 26 at their ends. Passing around the pulleys 26 is a cable 27 carrying at its outward end the rings 28 to which are secured the front members of the harness for the horses, as is well understood.

It will be seen from the above that the cradle 1 is supported from the wheels 9 and the wheels 23. In order, however, to provide for the easy loading of the cradle and the easy transportation of the loaded cradle across the field, I have designed the mechanism so that the forward end of the cradle may be carried in a low and a high position. This is so that the tines may run along the ground and readily pass under the shocks of grain until a sufficient number of shocks have been loaded in the cradle and then the entire load may be elevated, as will be described, so that it may be readily transported across the field to the desired destination without dragging the load on the ground.

The means for lifting the forward end of the sweep appear in duplicate at the right and left side of the cradle, and therefore a description of the construction at one side of the machine will suffice.

Carried by the uprights 6 and 7 are suitable racks 30. Journalled in the uprights 6 and 7 is the shaft 31 which carries at its ends the pinions 32 to engage the racks and the wheel 9 is mounted for rotation on the shaft between the uprights 6 and 7. On the inner side of the wheel 9 is provided a clutch mechanism 33 which comprises a cup-shaped member 34 carried by the hub 35 of the wheel and a cup-shaped member 36 telescopically arranged with respect to the member 34. The cup-shaped member 36 is keyed to the shaft 31 and carries the pawls 37, 38 which are pivoted on the securing means 39, 40. The pawl 37 has a detent 41 therein to receive the end 42 of the pawl 38 and the pawls carry ears 43 and 44 respectively, which are connected by a suitable spring 45, which tends to hold the pawls in locked engagement. One end of the pawl 37 carries a roller 46 which engages the internally scalloped member 48 of the cup 34. The outer ends 49, 50 respectively of the pawls 37, 38 project outwardly through the slots 51 and 52 in the casing 36 so that they may be moved, as will be more fully described.

The guard member 53 is secured to the cup 36 to enclose the springs 45 and hold the pawls 37, 38 against lateral movement.

Figure 6:
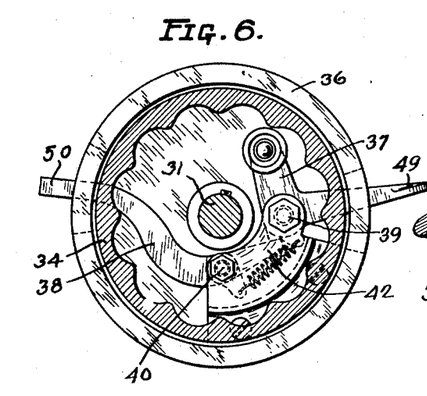
Fig. 6 is a section on line 6—6 of the clutch mechanism shown in Fig. 7.
Figure 7:
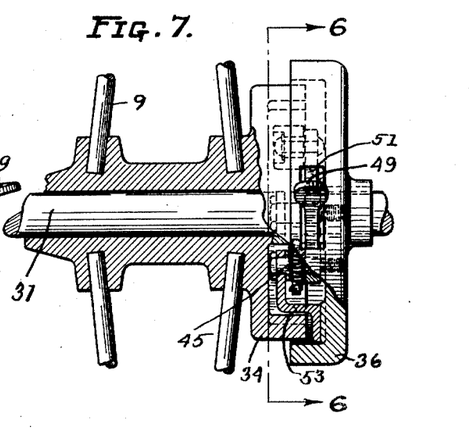
Fig. 7 is a view partly in section of the clutch mechanism cooperating with a front wheel.

It will thus be seen that when the end 50 of the pawl 38 is elevated from the position shown in Fig. 6, the end 42 will be pulled out of the socket at 41, and due to the pressure of the spring 45 the roller will be caused to engage in one of the scallops 48, at which time continued movement of the wheel 9 drives the shaft 31 and consequently raises the members 6 and 7 by movement of the racks 30 and pinions 32 disposed at the ends of the shafts 31. In other words the clutch shown in Fig. 8 is in driving position.

Figure 8:
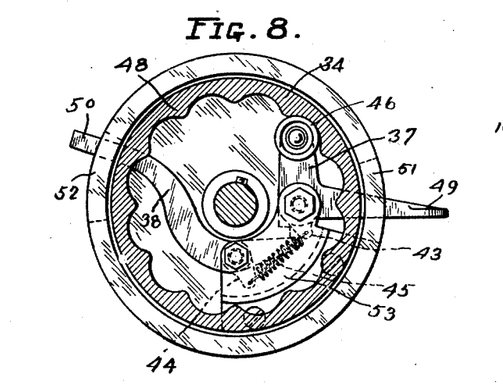
Fig. 8 is a view similar to Fig. 6 with the clutch members in a different position.

When the end 49 of the pawl 37 is engaged to rotate the pawl counterclockwise as shown in Fig. 8, the roller 46 is removed from one of the scallops 48 and due to the pressure of the spring the pawl 37 engages in the detent 41 and holds the roller out of driving position, as shown in Fig. 6.

The mechanism for operating the ends 49, 50 of the pawls 37, 38 will be described hereinafter.

Figure 4:
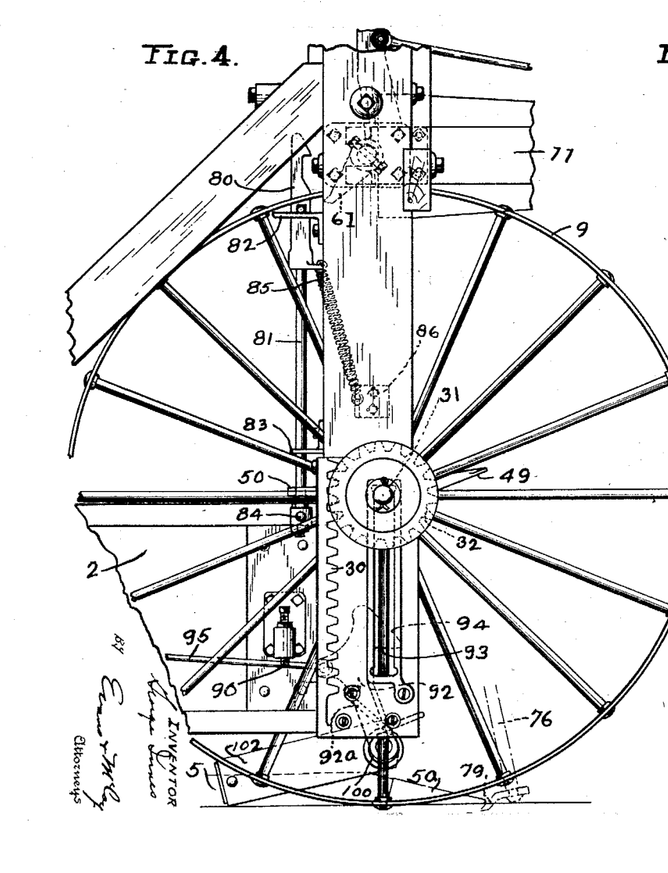
Fig. 4 is an enlarged fragmentary side elevation of the forward portion of the machine showing the elevating mechanism.
Figure 5:
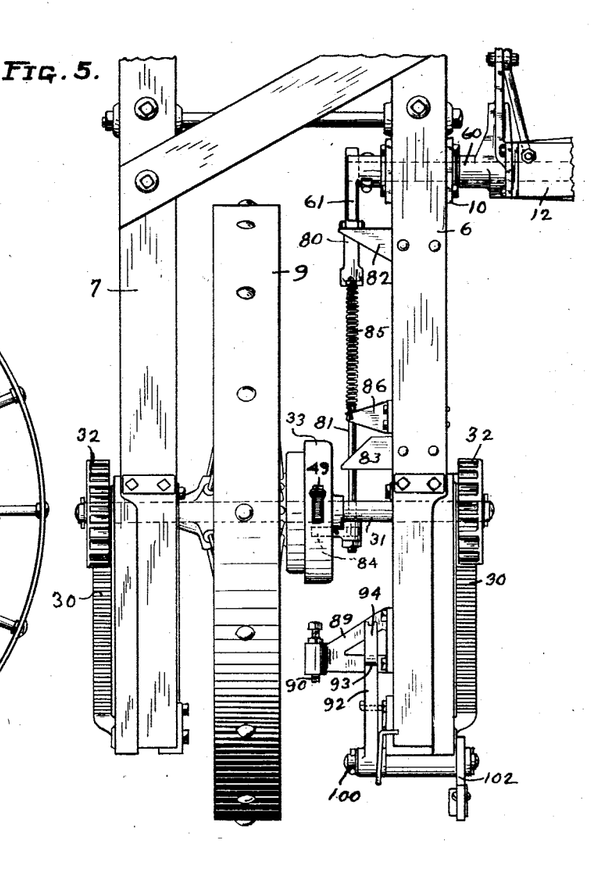
Fig. 5 is a fragmentary front elevation of the mechanism shown in Fig. 4.

As previously described, the gate 11 is journalled between the posts 6. This is accomplished by providing the gate with outwardly extending shafts 60 which are received in suitable bushings 10 in the posts or columns 6 and extend beyond them. Secured to the outer ends of the shaft 60 are hooks 61, as seen in Figs. 4 and 5. Secured to the member 12 of the gate and about centrally thereof is a bracket 62 to which one end of the rod 63 is fastened. The rod 63 is fastened at its other end to the operating lever 19 which is provided with a conventional spring pressed pawl 64 to engage a series of notches in the rack 65. During the loading operation the rod 19 is pulled back to hold the gate in a substantially horizontal position, as shown in Fig. 2.

At the upper portion of each end of the gate 11 is secured a bracket 66 to the outer end of which are pivoted links 67, 68. Secured to the side members 2 of the cradle are rods 69 which are provided at their ends with inturned portions 70 to receive the threaded rods 71. Between the rods 71 and the links 68 are disposed suitable springs of the desired strength to assist in holding the gate in open position and assist the operator in opening and closing the gate, the springs serving as a partial or complete counterbalance for the gate, as desired. The nuts 72 disposed on the threaded end of the rod 71 permit adjustment of the tension of the spring as well as holding the rod 71 in place. Suitable truss rods 73 are secured to the links 66 and to the bottom member 13 of the gate to make a more rigid construction.

Figure 1:
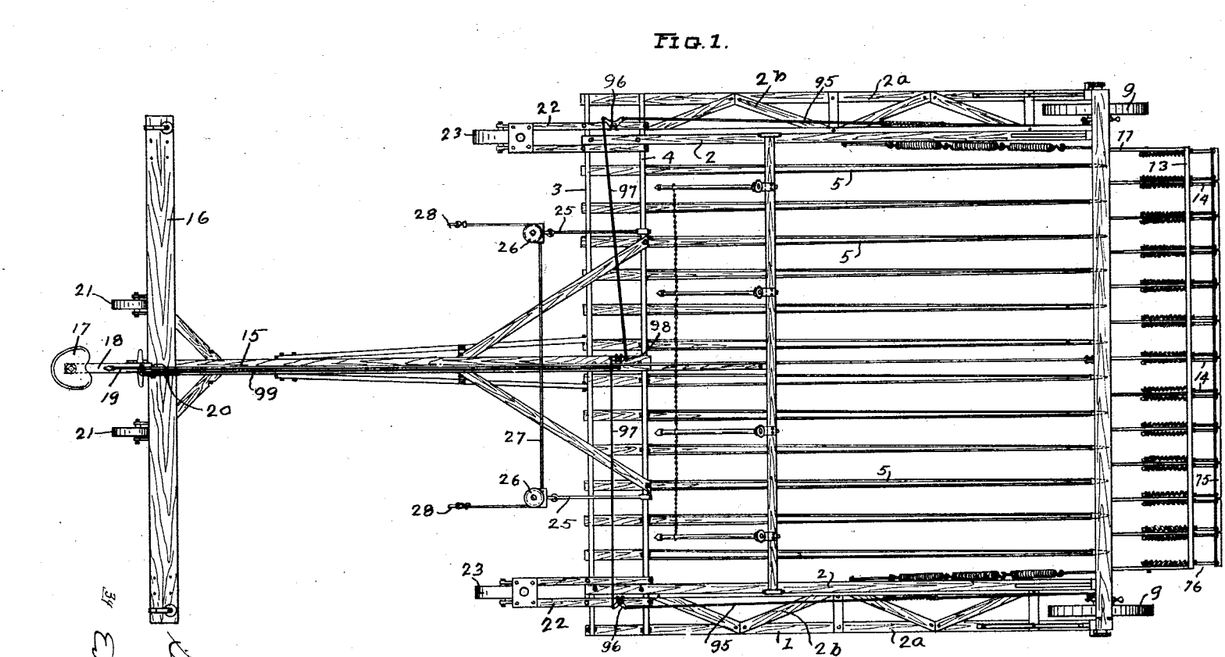
Figure 1 is a plan view of the shock sweep.
Figure 2:
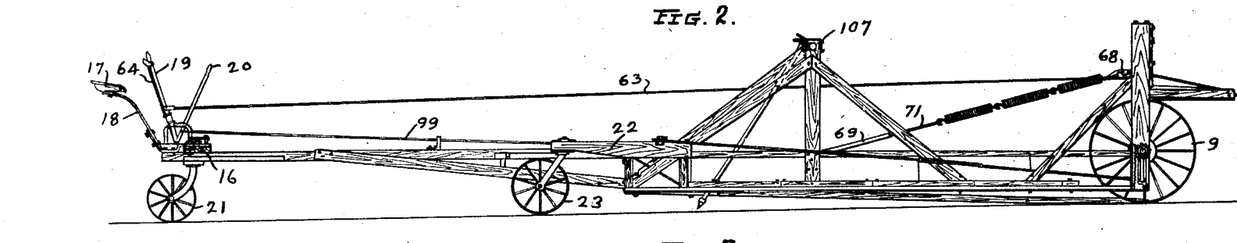
Fig. 2 is a side elevation.
Figure 3:
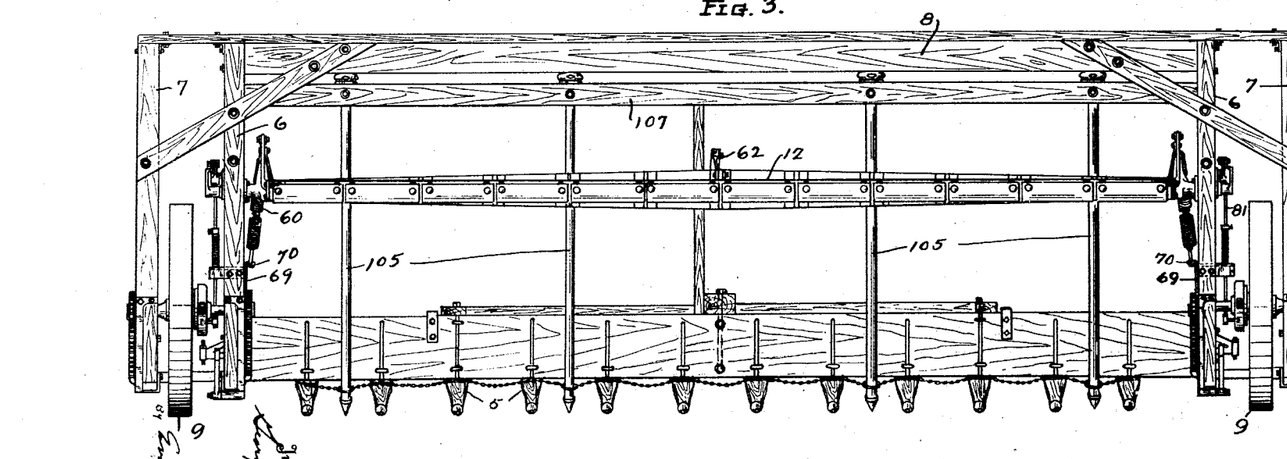
Fig. 3 is a front view of the shock sweep with the gate in elevated position.
Figures 13, 14, 15:
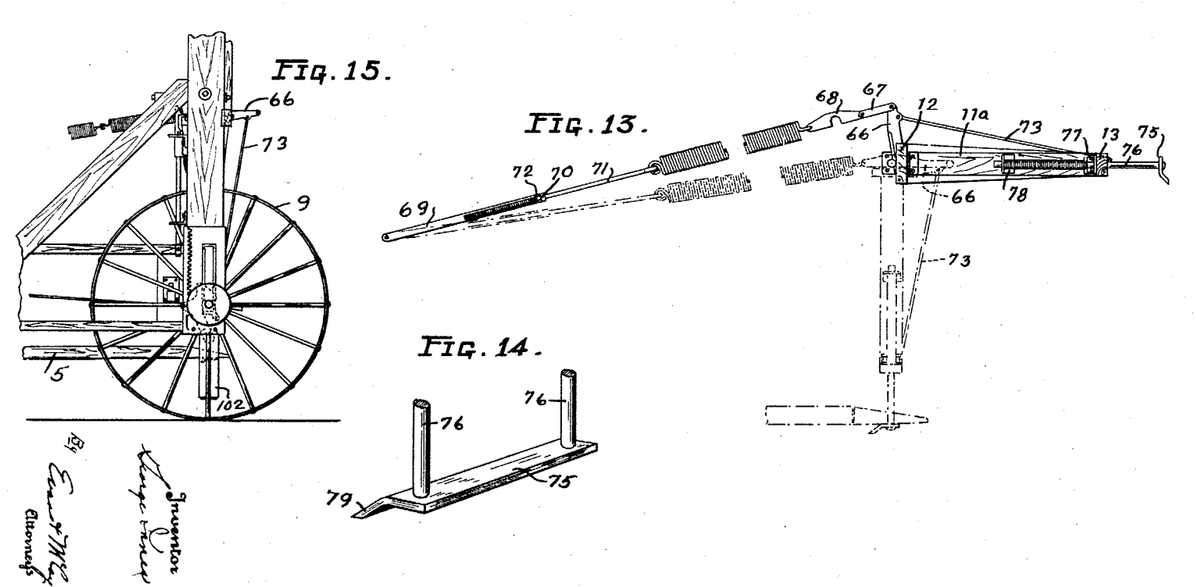
Fig. 13 is a fragmentary view showing the gate operating mechanism.
Fig. 14 is a fragmentary view of the lower portion of one of the stirrups of the gate.
Fig. 15 is a side elevation of the front portion of the machine showing the cradle in elevated position.

After loading of the cradle completed, and it is desired to carry the load across the field to the thresher or the desired point for unloading, the operator releases the lever 19 which permits the gate to swing downwardly from the position shown in Fig. 2 to the position shown in the dotted lines in Fig. 13. Each of the stirrups 14 comprises a bottom horizontal member 75 and the two supporting rods 76 which pass through the member 13. On the upper side of the member 13 suitable collars or washers 77 are secured to the rods 76 and the upper ends of the rods are guided in brackets 78 secured to the intermediate members 11ª of the gate. The rods 76 readily slide through the perforations in the clips. Helical springs 76ª are provided which seat on the brackets 78 at one end and on the collars 77 at the other end, and thus tend to hold the stirrups 14 outwardly of the gate.

The bottom member 75 of each stirrup is provided with a rearwardly extending inclined portion 79. These are driven a slight distance into the ground upon the falling of the gate after its release. The forward ends of the tines 5 are preferably covered with metallic shoes 5ª and these shoes engage the ground during forward movement of the sweep as previously set forth. When the gate falls to the ground, the bottom member 75 of the stirrups strikes the ground in advance of the forward ends of the tines and as the machine continues in its forward movement the sharp inclined edge portions 79 of the stirrups are pressed into the ground a depth greater than the tines are pressed by the weight of the load. This associates the forward ends of the tines engaging the upper sides of the inclined portions 79 of the stirrups so that the tines will be guided respectively into the stirrups 14, as indicated in Fig. 4. The gate assumes a substantially vertical position with the member 75 underlying the tines back of the extreme forward ends as shown in dotted lines in Fig. 13. Preferably the springs 76ª of the stirrups are of such strength that they act as shock absorbers to take up the shock of the falling of the gate to the ground.

After the tines are each engaged and the stirrup in alignment therewith, the gate together with the forward ends of the tines is elevated by the mechanism above mentioned, so that the tines will be clear of the ground and consequently there will be no dragging of the load in transporting it to the desired point.

Carried by each upright 6 is a rod 81 which cooperates with the clutch mechanism at each side of the machine and one side only will be described.

The rod 81 terminates in a hook 80 at its upper end and in a projecting lever 84 at its lower end. The rod 81 is suitably supported by means of brackets 82, 83 in which it is slidable. It is held in downward position by the springs 85 secured to the lower portion of hook 80 and to the bracket 86 on the upright 6. Secured to the side member 2 adjacent the upright 6 is an outwardly extending bracket 89 provided with an adjustable set screw forming a stop 90 which lies in the vertical plane of the pawl member 49. Secured to the lower part of each upright 6 is a pivoted member 92 having a hook portion with a flat engaging surface 93 and an inclined portion 94. The hook 92 is normally held by the spring 92ª so that the portions 93 and 94 lie in a vertical plane with the shaft 31.

At the rearward portions of the hooks 92 are pivoted the rods 95. The rear ends of the rods 95 are connected to bell crank levers 96 pivoted on the arms 22. To the other ends of the bell crank levers 96 are secured the rods 97 which are in turn pivoted to a rotatable lever 98 mounted on the longitudinal member 15. The lever 98 is controlled through the rod 99 and the operating lever 20 so that when the driver pulls the lever 20 the rod 99 will be pulled rearwardly, the rods 97 will be pulled inwardly and the rods 95 will be pulled rearwardly, which in turn will pull the hooks 92 rearwardly about their pivots 100.

When the driver releases the lever 19 and permits the gate 11 to fall until the stirrups 14 strike the ground, the hook 61 engages the hook 80 and raises it until the projection 84 at the lower end of the rod 81 engages the pawl 50 of the clutch mechanism. As previously explained, such movement of the pawl 50 closes the clutch and causes the pinions 32 to be driven upon forward movement of the machine, thereby raising the racks 30 which are carried by the uprights 6 and 7, thus raising the entire forward end of the cradle, until the pawl 49 rotating about the shaft 31 strikes the adjustable stop 90 when the clutch is opened.

Before this happens, however, the inclined portion 94 of the hook 92 has engaged the shaft 31 and been forced rearwardly against the action of the spring 92ª until the flat portion 93 of the hook is above the top of the shaft, at which time the hook will be moved over the shaft 31 with the portion 93 of the hook overlying the shaft. When the clutch is opened the entire forward end of the machine will be supported by the hooks 92 resting on the shaft 31 as shown in Fig. 15. The load is thus mounted on wheels a sufficient distance above the ground to prevent dragging and may be readily transported to the point desired.

When it is desired to unload the shock sweep the operator pulls the lever 20 rearwardly, and this results in pulling the hooks 92 off the shafts 31. Pivoted at the bottom of the upright members 6 are members 102 which hang pendant in a vertical position when the front of the cradle is in elevated position, as seen in Fig. 15, and these members engage the soft ground first and act as shock absorbers to lessen the force of the fall of the cradle. These members may be driven into the ground by the weight of the machine and load, but this is immaterial as movement of the machine forward or backwards simply causes the members 102 to drag and permits the shaft or wheel axle 31 to move to its lowermost position in the slots in the uprights 6 and 7. If the springs 76ª are made of sufficient strength, these shock absorbers 102 may be unnecessary, as the shock of the fall of the gate may be taken up practically entirely by the springs.

In order to unload the load of shocks from the cradle, the sweep is pulled backward by the horses, which causes the members 79 of the stirrups on the gates to engage the ground and the stirrups are freed from the tines, so that the operator may readily lift the gate to a substantially horizontal position by means of the lever 19 and rod 53, as previously explained. As the gate comes to horizontal position, the hooks 61 engage the hook 80 of the rod 81 and push it rearwardly in the slotted support 82. The hook 80 is returned to position for engagement with the hook 61 by the spring 85.

Secured to the frame of the machine in advance of the rearward portion of the cradle are uprights carrying a transverse beam 107. The uprights are connected to the frame of the machine by suitable bracing members 108 which strengthen and increase the rigidity of the machine.

Figures 9, 10:
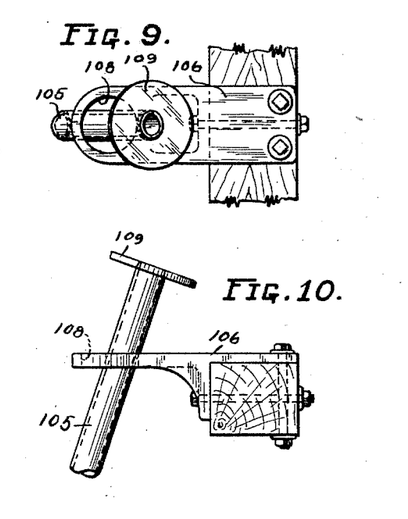
Fig. 9 is a fragmentary top plan view of a stripper member.
Fig. 10 is a fragmentary side elevation of the construction shown in Fig. 9.
Figure 11:
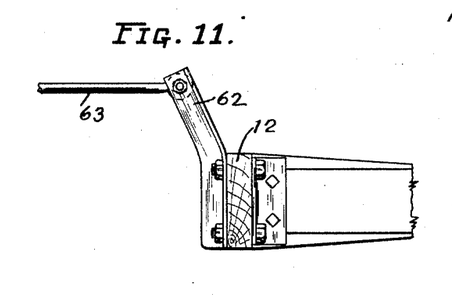
Fig. 11 is a side elevation partly in section of a portion of the gate and the operating rod.
Figure 12:
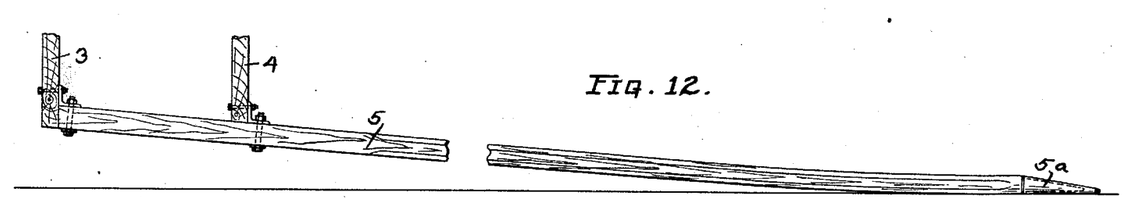
Fig. 12 is a side elevation of a tine showing its connection to the cradle.

In order to be sure that upon backing the sweep the load will be left at the point desired, I have provided a series of strippers 105 which are loosely carried in the brackets 106 secured to the transverse beam 107. The strippers 105 comprise rods, preferably with pointed portions at their lower ends to engage the soft ground upon backing the machine, and they are preferably connected by a loose chain encircling the stripper rod and resting on top of the tines. The strippers are positioned intermediate the tines 5, so that as the machine is backed the shocks are loaded at the rear portion of the cradle and pushed forwardly until they engage the ground, and the tines may be readily withdrawn. The brackets 106, shown in Figs. 9 and 10, are provided with a large aperture 108 to permit longitudinal and slight transverse movement of the tines. The tines are preferably provided with heads 109 sufficiently large so that they will not descend through the apertures 108 upon forward travel of the sweep.

It will be seen that the guiding of the shock sweep is relatively simple in view of the fact that the cable 27 permits the horses to swing either to the right or to the left a substantial distance. Since the rear portion of the cradle frame, and the support for the driver or operator are supported by the universally mounted caster wheels 21, 23 when the horses are swung at the extreme right or extreme left position, the sweep can be turned either approximately about the right front wheel 9 or the left front wheel 9 as a pivot. Thus, the operator can readily make short turns to pick up shocks that may be irregularly placed and to avoid obstacles in the field. After the load is discharged from the sweep and the operator has a substantial distance to go to the field before loading, it is preferable to again lift the tines from the ground by means of the gate and thus carry them above the ground so that they will not drag the entire distance to the point where loading is to be resumed.

Such raising of the gate is, of course, done in the same manner as previously described and similarly when the point where loading is to be resumed the gate may be opened and the tines permitted to engage the ground to readily slide under and pick up the shocks to be loaded.

It will thus be seen that I have provided a very efficient shock sweep for gathering shocks and transporting them to the point desired in their upright position, thus avoiding manual handling of the bundles forming the shock. It will also be seen that by bodily loading and carrying shocks of grain in the upright position, any loose grain or broken or unbound bundles will be bodily carried along with the shocks to the desired destination substantially without loss.

It will also be noted that the shock sweep herein disclosed may readily carry a relatively large and heavy load of shocked grain for the reason that the load is lifted clear of the ground and entirely supported by wheels in the transportation of the load to the desired destination.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A shock sweep comprising a shock gathering cradle including a frame having a rear portion, lateral sides and an open front portion, a bottom formed of gathering tines secured to the frame, a pivotally mounted normally open gate adapted to provide a closure for said open forward end of the cradle, said gate extending forwardly of said shock sweep when in open position and means under the control of the operator for closing said gate.

2. A shock sweep comprising a cradle having lateral sides, a normally open forward end, a pivotally mounted gate under the control of the operator adapted to close the forward end of the cradle after collection of the load, said gate extending forwardly of said shock sweep when in open position and means responsive to the forward movement of the sweep for lifting the forward end of the cradle out of loading engagement with the ground.

3. A shock sweep comprising a cradle having lateral sides and a normally open forward end, and a gate under the control of the operator adapted to close the forward end of the cradle after collection of the load, said gate having yieldingly supported means adapted to underlie and support the forward end of the gathering cradle when the gate is closed.

4. A shock sweep comprising a cradle having lateral sides and a normally open forward end, a gate under the control of the operator adapted to close the forward end of the cradle after collection of the load, said gate having means adapted to underlie and support the forward end of the gathering cradle when the gate is closed, and mechanism actuated by the forward movement of the shock sweep for elevating said gate and lifting therewith the forward end of the cradle.

5. A shock sweep comprising a shock gathering cradle having closed sides, a bottom formed of gathering tines, and a normally open forward end, a supporting frame for the sides and rear portion of the cradle, said frame being supported on wheels, a gate for the forward end of the cradle supported from said frame and normally held in open position, a plurality of yieldingly supported stirrups carried by the gate and adapted, when the gate is lowered, to engage the ground in advance of the open forward end of the cradle and to be carried under the cradle by the forward movement of the sweep, and means for raising the forward end of the frame after engagement of the stirrups with the tines of the cradle to support the cradle on said wheels and free of engagement with the ground.

6. A shock sweep comprising a shock gathering cradle having closed sides and a normally open forward end, a supporting frame for the sides and rear portion of the cradle, a gate for the forward end of the cradle supported from said frame and normally held in open position, a plurality of yieldingly supported stirrups carried by the gate and adapted, when the gate is lowered, to engage the ground in advance of the open forward end of the cradle and to be carried under the cradle by the forward movement of the sweep, and means actuated by the forward movement of the sweep for raising free from the ground the gate and the forward end of the cradle.

7. A shock sweep comprising a cradle having sides and a normally open forward end, a supporting frame for the sides and a rear portion of the cradle, a gate carried by said frame, said gate being under control of the operator and adapted to close the forward end of the cradle after collection of the load, a plurality of yieldingly supported stirrups carried by the gate, said cradle having a plurality of forwardly extending tines forming the bottom of the cradle and adapted to collect the load, said stirrups being mounted to engage the ground in advance of said tines upon release of the gate, whereby each tine enters a stirrup upon forward motion of the sweep, and mechanism actuated by the forward movement of the shock sweep for elevating said gate and lifting therewith the forward end of the cradle.

8. A shock sweep comprising a cradle formed by side portions, a rear portion, forwardly extending tines forming the bottom portion and adapted to normally contact with the ground at their forward ends, a normally open forward portion, a gate for the forward end of the cradle and having a plurality of yieldingly supported stirrups, said stirrups being arranged to engage the ground in advance of the open forward end of the cradle and to be carried under the cradle by forward movement of the sweep, said stirrups being provided with downwardly inclined portions to assist the entrance of said tines into the stirrups, and mechanism actuated by the forward movement of the sweep for elevating the gate and lifting therewith the forward ends of said tines.

9. A shock sweep comprising a cradle having sides and a normally open forward end, a supporting frame for the sides and rear portion of the cradle, a gate carried by said frame, said gate being under control of the operator and adapted to close the forward end of the cradle after collection of the load, a plurality of yieldingly supported stirrups carried by the gate, said cradle having a plurality of forwardly extending tines forming the bottom of the cradle and adapted to collect the load, said stirrups being mounted to engage the ground in advance of said tines, each stirrup individually engaging a single tine upon forward motion of the sweep, and means actuated by the forward movement of the sweep for elevating the gate and thereby lifting the stirrups and forward portions of the tines to facilitate carrying of the load.

10. A shock sweep comprising a shock gathering cradle including a frame having a rear portion, lateral sides and an open front portion, a bottom formed of gathering tines secured to the frame and a normally open gate adapted to form a closure for said open end of the cradle, means under the control of the operator for closing the gate, means controlled by the forward movement of the shock sweep for elevating the cradle, means under the control of the operator for dropping the forward end of the cradle, and means for stripping the load from the tines of the cradle upon rearward movement of the sweep to deposit the load at the desired point.

11. A shock sweep comprising a shock gathering cradle including a rear portion, lateral sides, a bottom portion and an open front portion, the forward end of said bottom portion normally engaging the ground, means under the control of the operator and operated by the forward advance of the sweep for lifting the open end of the cradle out of engagement with the ground, means under the control of the operator for dropping the forward end of the cradle with the load upon the ground, and means operated by rearward movement of the sweep to assist in discharging the load upon the ground.

12. A shock sweep comprising a shock gathering cradle, a rear portion, lateral sides, a bottom portion and an open forward portion, the forward end of said bottom portion normally engaging the ground, and means under the control of the operator and operated by the forward advance of the sweep for lifting the open end of the cradle out of operative engagement with the ground, means for locking the cradle in lifted position for carrying the load to the desired point, means under the control of the operator to open the gate and drop the load to the ground at the desired point, whereby rearward motion of the sweep causes the load to remain in the deposited position.

13. A shock sweep comprising a shock gathering cradle including a frame having a rear portion, lateral sides, a bottom portion formed of forwardly projecting tines secured to the frame and an open front portion, axles carried by the forward portions of the frame, wheels mounted on said axles, means under the control of the operator for causing said forwardly disposed wheels to raise the forward portion of the sweep upon forward movement of the shock sweep, automatic means for disengaging said raising means after the cradle has been raised a predetermined amount and causing the forward portion of the cradle to be supported on said axles for ready transportation of the sweep with the cradle supported above the ground, and means releasable by the operator to drop the cradle to the ground at the desired point.

14. A shock sweep comprising a shock gathering cradle including a frame having a rear portion, lateral sides, a bottom portion formed of forwardly projecting tines secured to the frame and an open front portion, axles carried by the forward portions of the frame, wheels mounted on said axles, the rear portion of said cradle being supported on universally mounted caster wheels, means under the control of the operator for causing said forwardly disposed wheels to raise the forward portion of the sweep upon forward movement of the shock sweep, automatic means for disengaging said raising means after the cradle has been raised a predetermined amount and causing the forward portion of the cradle to be supported on said axles for ready transportation of the sweep with the cradle supported above the ground, and means releasable by the operator to drop the cradle to the ground at the desired point.

15. A shock sweep comprising a shock gathering cradle including a frame having an open front portion, a cradle bottom formed of tines secured to said frame, said tines extending toward said open front portion and normally engaging the ground, means carried by the frame cooperable with said tines to support the forward ends thereof, and means to elevate the forward portion of said frame, whereby said tines may be raised from the ground.

16. A shock sweep comprising a shock gathering cradle including a frame having lateral sides and an open front portion, a cradle bottom formed of tines secured to said frame, said tines extending toward said open front portion and normally engaging the ground, wheels disposed adjacent the forward portion of said frame and arranged to support same, means carried by the frame cooperable with said tines to support the forward ends thereof, and means associated with said wheels and actuated by forward movement of the sweep to elevate the forward portion of said frame, whereby said tines may be raised from the ground.

In testimony whereof I affix my signature.

GEORGE INNES.